(12) United States Patent
Waechter

(10) Patent No.: US 11,604,911 B2
(45) Date of Patent: Mar. 14, 2023

(54) SIMULATION OF GAS DYNAMICS OF DIFFERENT GAS CHANNEL GEOMETRIES IN FUEL CELLS

(71) Applicant: dSPACE digital signal processing and control engineering GmbH, Paderborn (DE)

(72) Inventor: Christian Waechter, Paderborn (DE)

(73) Assignee: DSPACE GMBH, Paderborn (DE)

(*) Notice: Subject to any disclaimer, the term of this patent is extended or adjusted under 35 U.S.C. 154(b) by 77 days.

(21) Appl. No.: 17/358,028

(22) Filed: Jun. 25, 2021

(65) Prior Publication Data
US 2022/0414302 A1    Dec. 29, 2022

(51) Int. Cl.
G06F 30/28       (2020.01)
H01M 8/0438      (2016.01)
H01M 8/0432      (2016.01)
H01M 8/04298     (2016.01)
F01N 9/00        (2006.01)
F01N 11/00       (2006.01)

(52) U.S. Cl.
CPC .......... *G06F 30/28* (2020.01); *H01M 8/0432* (2013.01); *H01M 8/0438* (2013.01); *H01M 8/04305* (2013.01); *F01N 9/005* (2013.01); *F01N 11/005* (2013.01); *F01N 2240/32* (2013.01); *F01N 2590/11* (2013.01); *F01N 2900/0402* (2013.01); *F01N 2900/0406* (2013.01)

(58) Field of Classification Search
CPC combination set(s) only.
See application file for complete search history.

(56) References Cited

U.S. PATENT DOCUMENTS 5,771,476 A * 6/1998 Mufford ............ H01M 8/04089
                                                    429/445
2006/0125441 A1 * 6/2006 Kolodziej ......... H01M 8/04992
                                                    320/101
(Continued)

OTHER PUBLICATIONS

Jesus M. Latorre, et al., "Object Oriented Simulation and Optimization of Hydroelectric Power Systems", Semantic Scholar, Dec. 2006, pp. 1-23, Allen Institute for AI, Seattle, USA.

*Primary Examiner* — Binh Q Tran
(74) *Attorney, Agent, or Firm* — Leydig, Voit & Mayer, Ltd.

(57) ABSTRACT

Systems and methods for simulating gas flow dynamics of a real hydrogen fuel cell system using a computer, wherein the real hydrogen fuel cell system includes a gas container volume network having gas container volumes interconnected by gas transport lines. The method includes defining volume element and flow channel classes, defining a plurality of volume instances and a plurality of flow channel instances, for each flow channel instance, creating a first interconnection representation that defines a source container volume and a destination container volume for the flow channel instance, wherein the first interconnection representation mimics a portion of the gas container volume network of the real hydrogen fuel cell system, and simulating, using the first interconnection representation, a thermodynamic state for each of the volume instances, the thermodynamic state representing thermodynamic parameter(s) in each container volume of the gas container volume network of the real hydrogen fuel cell system.

20 Claims, 10 Drawing Sheets

(56) References Cited

U.S. PATENT DOCUMENTS

| | | | |
|---|---|---|---|
| 2008/0213638 A1* | 9/2008 | Brantley | H01M 8/04007 429/459 |
| 2008/0241614 A1* | 10/2008 | McCanney | B60L 58/40 429/411 |
| 2014/0120446 A1* | 5/2014 | Zhang | H01M 8/04753 429/444 |
| 2017/0012309 A1* | 1/2017 | Venkat | H01M 8/04626 |
| 2019/0267642 A1* | 8/2019 | Okuyoshi | G05B 17/02 |

* cited by examiner

SIMULATION OF GAS DYNAMICS OF DIFFERENT GAS CHANNEL GEOMETRIES IN FUEL CELLS

FIELD

Embodiments of the invention relate to methods for simulating or modelling gas dynamics of different gas channel geometries in a fuel cell system, a computer system and a non-transitory computer-readable storage medium.

BACKGROUND

Fuel cells are becoming increasingly important in vehicle propulsion systems. A typical hydrogen fuel cell system includes an air supply path (cathode), a hydrogen supply path (anode), a fuel cell stack and a cooling circuit. An electronic control unit (ECU) typically controls operation of the fuel cell system and its various components and sub-systems. The ECU uses various control algorithms to actuate the components of the fuel cell system, for example to control hydrogen injection, and to control valves, pumps and compressors, for optimal operation of the fuel cell.

During ECU testing regimens, the test system must appropriately process the actuation controls and at the same time, the sensor values from the fuel cell system, such as pressure and temperature, must be continuously provided to the ECU.

To better optimize and understand performance of various functions of the fuel cell system it may be desirable to simulate operation of a model fuel cell system to optimize ECU and fuel cell system performance.

SUMMARY

According to an embodiment, a method is provided for computer-based simulation or modelling of gas flow dynamics of a real hydrogen fuel cell system using a computer, wherein the real hydrogen fuel cell system includes a gas container volume network having gas container volumes interconnected by gas transport lines. The method includes defining a volume element class representing a gas container volume in a model fuel cell, defining a flow channel element class representing a gas transport line in the model fuel cell that transports gas from one gas container volume to a different gas container volume, defining a plurality of volume instances of the volume element class corresponding to a plurality of gas container volumes in the real hydrogen fuel cell system, and defining a plurality of flow channel instances of the flow channel element class corresponding to a plurality of gas transport lines in the real hydrogen fuel cell system. The method may also include, for each of the plurality of flow channel instances, creating a first interconnection representation that defines a source container volume and a destination container volume for the flow channel instance, wherein the first interconnection representation for the plurality of flow channel instances mimics a portion of the gas container volume network of the real hydrogen fuel cell system, and simulating, using the first interconnection representation, a thermodynamic state for each of the plurality of volume instances, the thermodynamic state representing at least one user-defined thermodynamic parameter in each container volume of the portion of the gas container volume network of the real hydrogen fuel cell system. In an embodiment, the method may also include, in the first interconnection representation, defining a gas inlet that introduces gas into a first container volume of the model fuel cell, and defining a gas outlet that outputs or releases gas from a second container volume of the model fuel cell.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
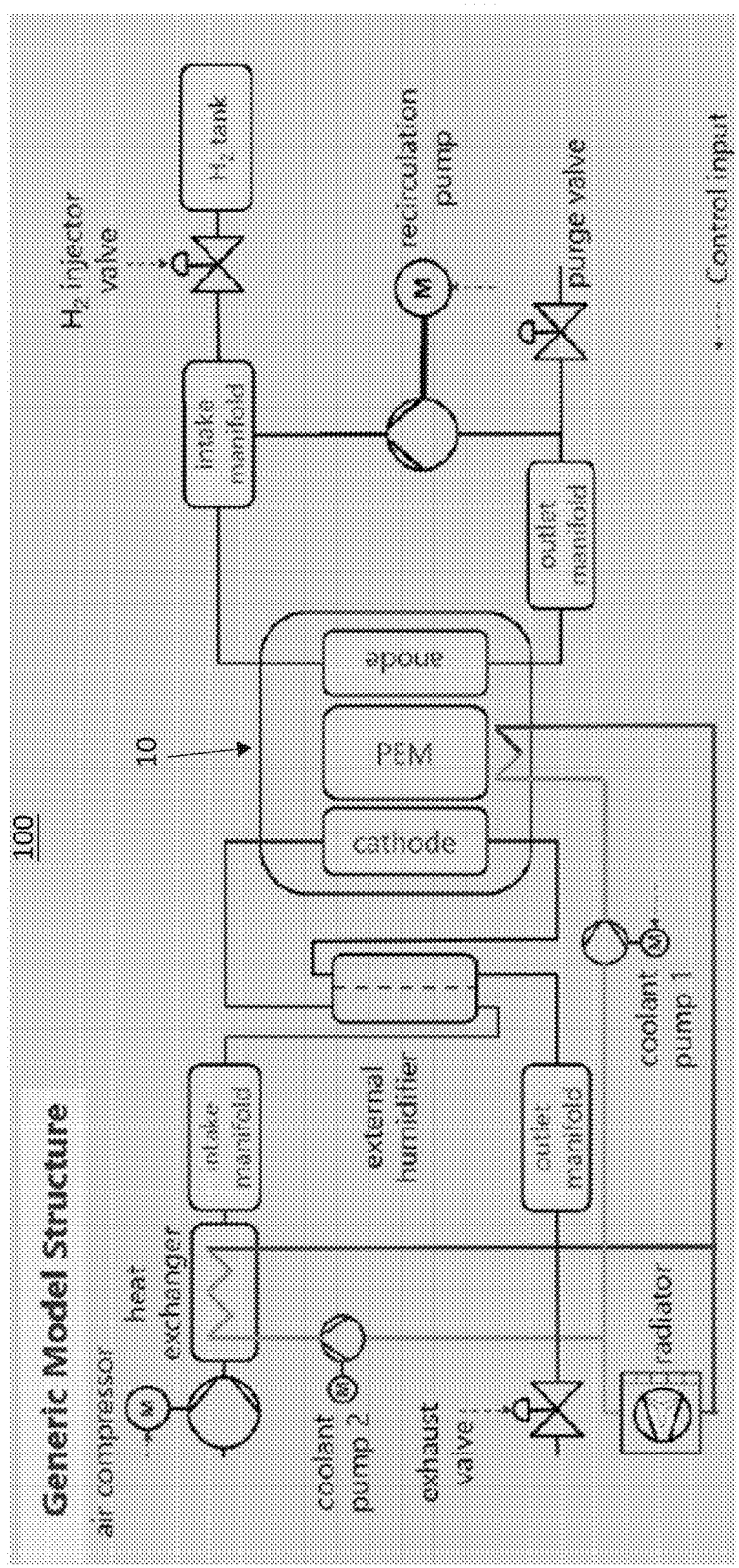
FIG. 1 illustrates an example of a hydrogen fuel cell system including a hydrogen fuel cell.

In certain embodiments, the present invention provides a method for computer-based simulation or modelling of gas dynamics in a fuel cell system using a computer.

Exemplary embodiments of the invention provide a method and a device for simulating gas dynamics of various gas channel geometries in a fuel cell system. Exemplary embodiments of the invention are able to dynamically simulate real fuel cell systems.

According to an embodiment, some or all of the steps of defining are performed in response to user input received from a computer user interface, such as a mouse or keyboard interacting with a graphical user interface (GUI).

According to an embodiment, the real hydrogen fuel cell comprises a proton-exchange membrane fuel cell.

According to an embodiment, the first interconnection representation for the plurality of flow channel instances mimics the entire gas container volume network of the real hydrogen fuel cell system.

According to an embodiment, the interconnection representation mimics an anode portion or a cathode portion of the real hydrogen fuel cell, and the method further includes creating, in a similar manner to creating the first interconnection representation, a second interconnection representation that mimics the other of the cathode portion or the anode portion of the real hydrogen fuel cell, and, in parallel with simulating the first interconnection representation, simulating the second interconnection representation. For example, simulating the second interconnection representation may include simulating, using the second interconnection representation, a thermodynamic state for each of a plurality of volume instances, the thermodynamic state representing at least one user-defined thermodynamic parameter in each container volume of the portion (e.g., the other of the cathode portion or the anode portion) of the gas container volume network of the real hydrogen fuel cell system.

According to an embodiment, the method further includes outputting or displaying a visual representation, e.g., on a display device of a computer system, of the simulated thermodynamic state of at least one gas container volume in the gas container volume network of the real hydrogen fuel cell system. The at least one thermodynamic parameter may include a temperature, or a pressure, or a temperature and a pressure. Additionally, or alternatively, other thermodynamic parameters that may be output or displayed include a mass flux, a relative humidity, and a water content (e.g. volume fraction of liquid water).

According to an embodiment, a system is provided that is configured to simulate gas flow dynamics of a real hydrogen fuel cell system, wherein the real hydrogen fuel cell system includes a gas container volume network having gas container volumes interconnected by gas transport lines. The system includes one or more processors, and a memory storing instructions, which when executed by the one or more processors, cause the one or more processors to implement various methods as described above and herein.

According to an embodiment, a non-transitory computer readable medium is provided that stores instructions, which when executed by one or more processors, cause the one or more processors to implement a method of simulating or modelling a real hydrogen fuel cell system as described herein.

In an exemplary embodiment, the invention provides a method for computer-based real-time simulation of dynamic, spatial pressure, temperature and mass flow distributions in a network of discrete volume elements that are variably connected to several flow elements. One example of such network is a hydrogen fuel cell system that includes a gas container volume network having a plurality of container volumes interconnected by a plurality of gas transport lines.

FIG. 1 illustrates an example of a generic hydrogen fuel cell system 100 including a fuel cell 10. Components of the fuel cell system 100 include various pumps, valves, manifolds and other components as are known and which are provided to supply in a continuous manner gas to the fuel cell 10. For example, an air compressor supplies air (incl. $O_2$) to a cathode side of the fuel cell 10 and a pressured hydrogen tank may supply hydrogen gas ($H_2$) to an anode side of the fuel cell. A membrane electrode assembly may include a proton exchange membrane (designated as PEM in the fuel cell 10) which may include a polymer electrolyte membrane and catalyst and gas diffusion layers as are well known. The PEM converts the chemical energy of the fuel (e.g., hydrogen) and an oxidizing agent (e.g., oxygen) into electricity through redox reactions as are well known. The fuel cell system may be connected to a vehicle drive train and its various components.

In certain embodiments, an object oriented programming approach is utilized to define various classes and attributes and parameters associated with various components present in the network to be modelled. For example, in an embodiment, for simulating or modelling a real hydrogen fuel cell system including a container volume network, class definition and instantiation actions include defining a volume element class representing a gas container volume in the model fuel cell, defining a flow channel element class representing a gas transport line in the model fuel cell that transports gas from one gas container volume to a different gas container volume, defining a plurality of volume instances of the volume element class corresponding to a plurality of gas container volumes in the real hydrogen fuel cell system, and defining a plurality of flow channel instances of the flow channel element class corresponding to a plurality of gas transport lines in the real hydrogen fuel cell system. Other actions could include for each of the plurality of flow channel instances, creating a first interconnection representation that defines a source gas container volume and a destination gas container volume for the flow channel instance, wherein the first interconnection representation for the plurality of flow channel instances mimics all or at least a portion of the gas container volume network of the real hydrogen fuel cell system, and in the first interconnection representation, defining a gas inlet that introduces gas into a first container volume of the model fuel cell, and defining a gas outlet that outputs or releases gas from a second container volume of the model fuel cell.

In an embodiment another action includes simulating, using the first interconnection representation, a thermodynamic state for each of the plurality of volume instances, the thermodynamic state representing at least one user-defined thermodynamic parameter in each container volume of the portion of the gas container volume network being simulated. For example, the at least one thermodynamic parameter may include a temperature, or a pressure, or a temperature and a pressure, or any other user-defined parameter. Other parameters might include humidity, water content, and mass flux parameters, and electrical current or voltage parameters, depending on the network component(s) being simulated.

In certain embodiments, the first interconnection representation may represent the entire gas container volume network of the real fuel cell being simulated. In certain embodiments, the first interconnection representation may represent a portion of the entire gas container volume network of the real fuel cell being simulated, such as only the anode side of the container volume network or only the cathode side of the container volume network. In such embodiments, where the first interconnection representation mimics an anode side or a cathode side of the real fuel cell, the method may further include creating a second interconnection representation that mimics the other of the cathode side or the anode side of the real fuel cell, and, in parallel with simulating the first interconnection representation, simulating the second interconnection representation to produce a simulation model of the entire gas container volume network of the real fuel cell.

In certain embodiments, the modelling takes place graphically utilizing a programming tool for modelling, simulating and analysing dynamical systems, such as Simulink™. Therefore, there may be requirements with regard to (1) clarity of the model, i.e. reduction of the necessary Simulink blocks, (2) easy parameterization of the model and (3) flexibility of the model. The last point thereby states that the networking of the volume elements with the flow elements without adding, deleting or reconnecting existing elements should only be possible via parameter definition.

In an embodiment, a class or a (library) block is defined for a volume element in a programming tool for modelling, simulating and analysing dynamical systems. For example, the block may be defined in a graphical simulation tool such as Simulink™. In an embodiment, the block is vector-capable; all block inputs can process vector input signals as long as all of these input signals have the same vector width. The vector width thus defines the number of volume elements simulated with this (library) block. Consequently, all output signals that are calculated by the library block also have this same vector width.

Another class or (library) block is defined for a flow element in a similar manner to a volume element block. This block is also vector-capable. Here, the vector width of the input signals, which must also be the same for all input signals, defines the number of flow elements connecting the volume elements. With this second (library) block, all mass flows exchanged between the volume elements are calculated, which are then output by means of output signals with a corresponding vector width.

Figure 2:
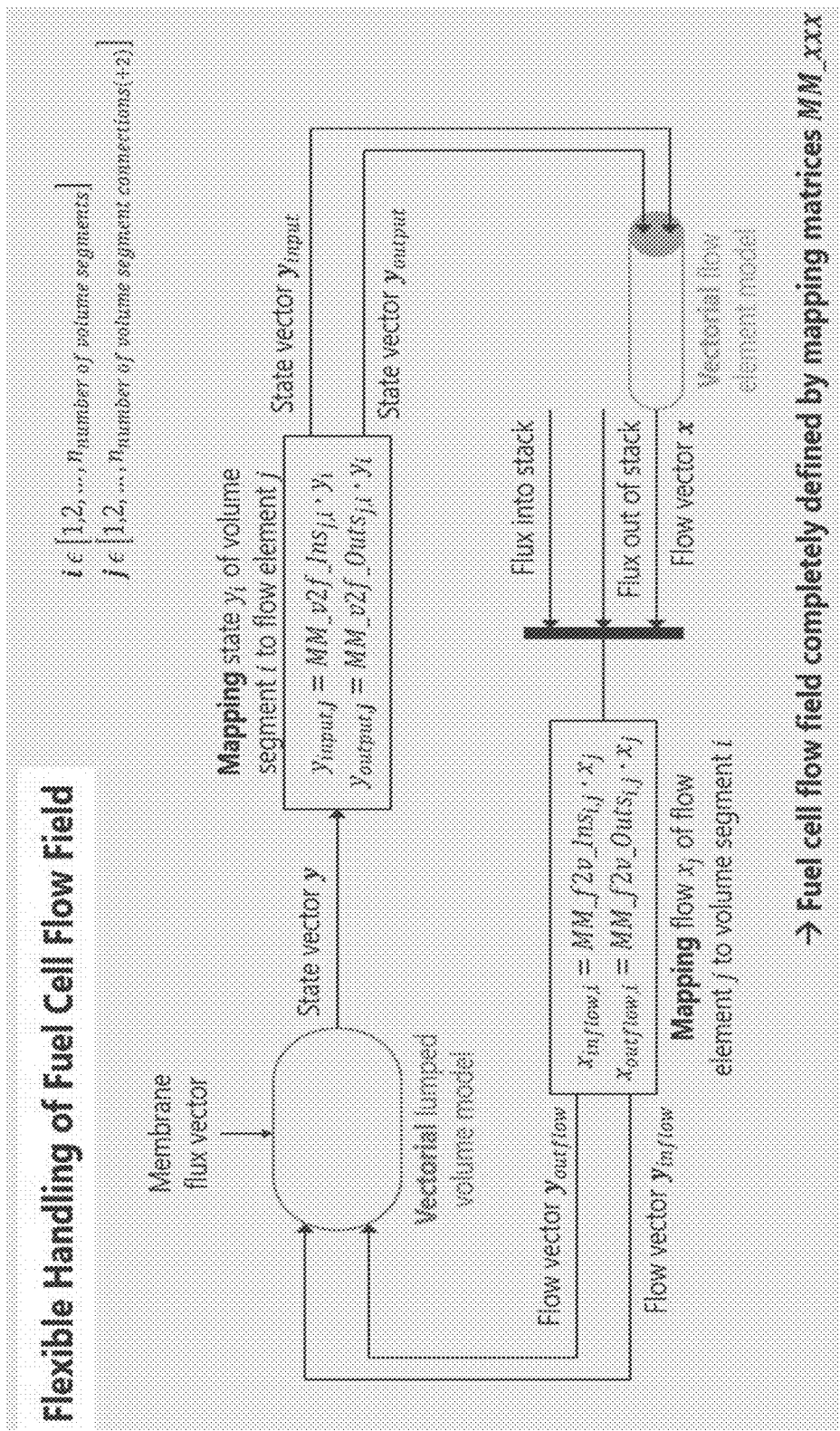
FIG. 2 illustrates a fuel cell flow field defined by a matrix formulation, according to an embodiment.

The number of volume elements does not necessarily correspond to the number of flow elements. Rather, both are variable and should be assigned to one another in order to define which mass flow flows from which volume element into which volume element. In an embodiment, this is done mathematically using mapping matrices. FIG. 2 illustrates a fuel cell flow field that is completely defined by a matrix formulation, according to an embodiment. As shown in FIG. 2, an example matrix formulation for mapping of the volume elements to the flow elements includes:

$$y\text{input},=MM\_v2f\_\text{In}sj,i \cdot yi$$

$$y\text{output},=MM\_v2f\_\text{Out}sj,i \cdot yi$$

wherein:
yi is a thermodynamic state variable of the ith volume element,
yinput, is a thermodynamic state variable of the volume element at the input of the jth flow element,
youtput, is a thermodynamic state variable of the volume element at the output of the jth flow element,
MM_v2f_Insj, is a mapping matrix, in which the line j assigns a thermodynamic state variable of the ith volume element to the input side of the jth flow element (each line contains exactly one one and otherwise zeroes), and
MM_v2f_Outsj, is a mapping matrix, in which the line j assigns a thermodynamic state variable of the ith volume element to the output side of the jth flow element (each line contains exactly one and otherwise zeroes).

As shown in FIG. 2, an example matrix formulation for mapping of the flow to the volume elements:

$$x\text{inflow},=MM\_f2v\_\text{In}si,j \cdot xj$$

$$x\text{outflow},=MM\_f2v\_\text{Out}si,j \cdot xj$$

wherein
$x_j$ is a flow variable (e.g. of the total mass flow) of the jth flow element
xinflow, is the sum of all flow variables which flow into ith volume element
xoutflow, is the sum of all flow variables which flow out from the ith volume element
MM_f2v_Insi,j is a mapping matrix, in which the line i combines all flow variables xj which flow into the ith volume element (each line contains one or also several ones and otherwise zeroes)
MM_f2v_Outsi,j is a mapping matrix, in which the line i combines all flow variables xj which flow out of the ith volume element (each line contains one or also several ones and otherwise zeroes).

In embodiments utilizing Simulink, selector blocks are implemented rather than matrix calculations. In a Simulink implementation, only 4 selector blocks are necessary for defining the network: 1) Volume element; 2) Mapping of volume element to the flow element; 3) Flow element; and 4) Mapping of flow element to volume element.

Figure 3:
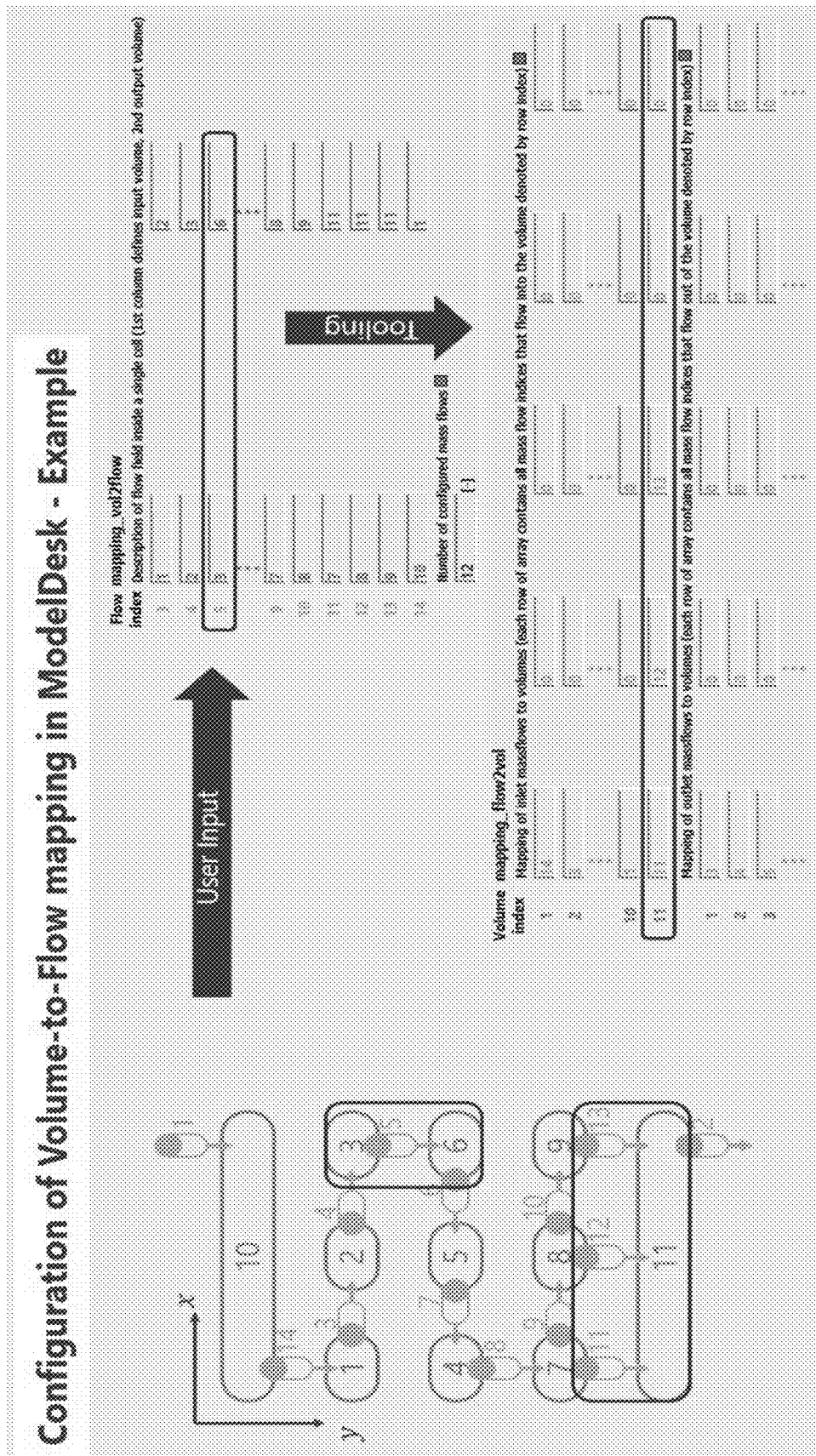
FIG. 3 illustrates configuration of volume-to-flow mapping according to an embodiment.

FIG. 3 illustrates configuration of volume-to-flow mapping for an exemplary network that includes volume elements 1 to 11. A user may, by way of user input using a user input device such as a mouse and/or keyboard, interact with a graphical input tool (e.g., GUI) as shown to configure and adjust flow fields inside a single cell.

In certain embodiments, a visual representation of the simulation(s) and/or the results may be output. For example, the simulated thermodynamic state of some or all container volumes in the gas container volume network of the (simulated) real hydrogen fuel cell system may be output or displayed on a display device.

Figure 4:
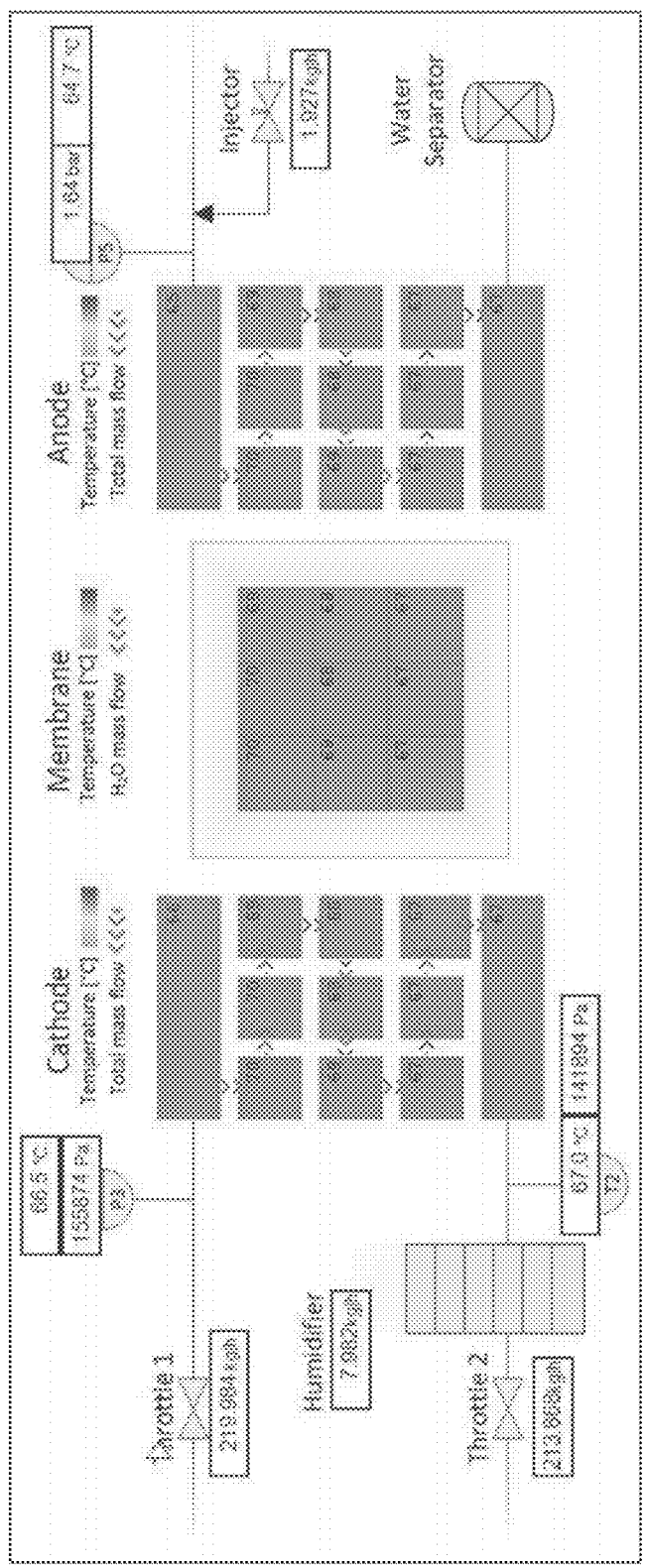
FIG. 4 illustrates a graphical user interface (GUI) for a fuel cell stack simulator and shows simulation outputs of various thermodynamic quantities, including simulated temperatures for each individual volume element, according to an embodiment.
Figure 5:
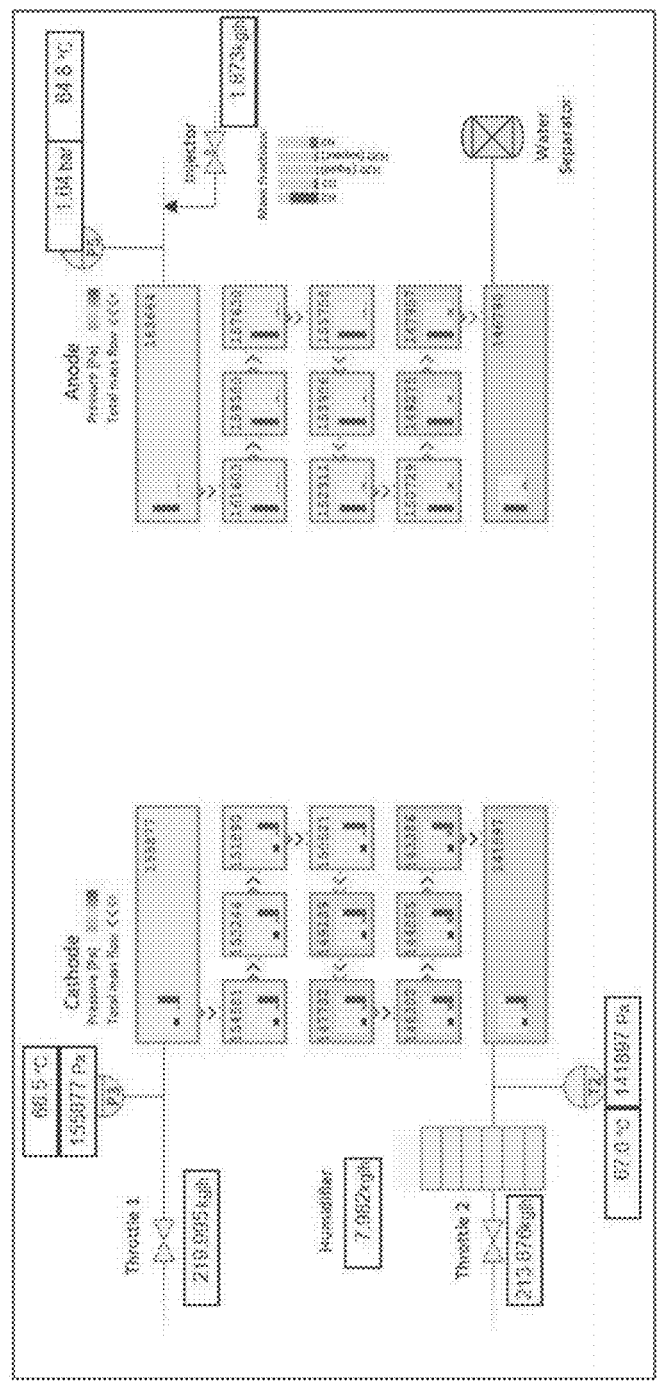
FIG. 5 illustrates a GUI for a fuel cell stack simulator and shows simulation outputs of various thermodynamic quantities, including simulated pressures for each individual volume element, according to an embodiment.
Figure 6:
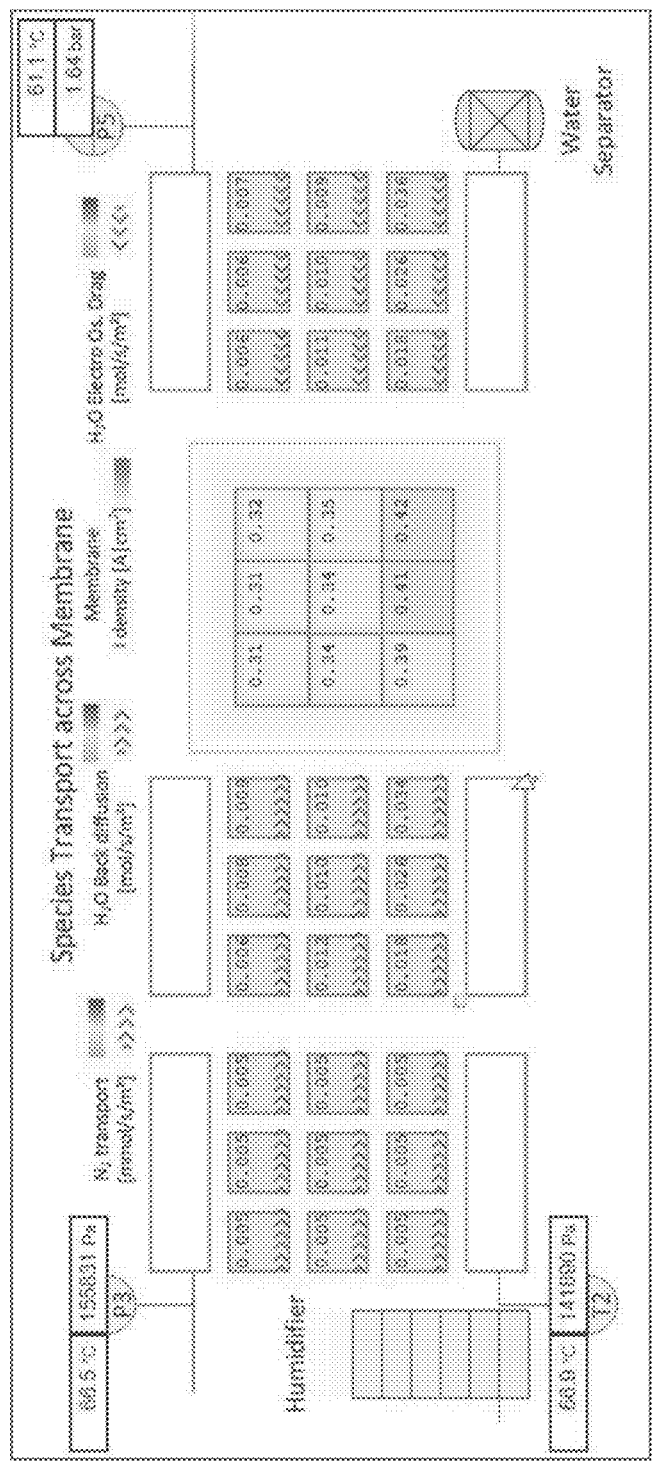
FIG. 6 illustrates a GUI for a fuel cell stack simulator and shows simulation outputs of various thermodynamic quantities, including simulated mass fluxes for each individual volume element, according to an embodiment.
Figure 7:
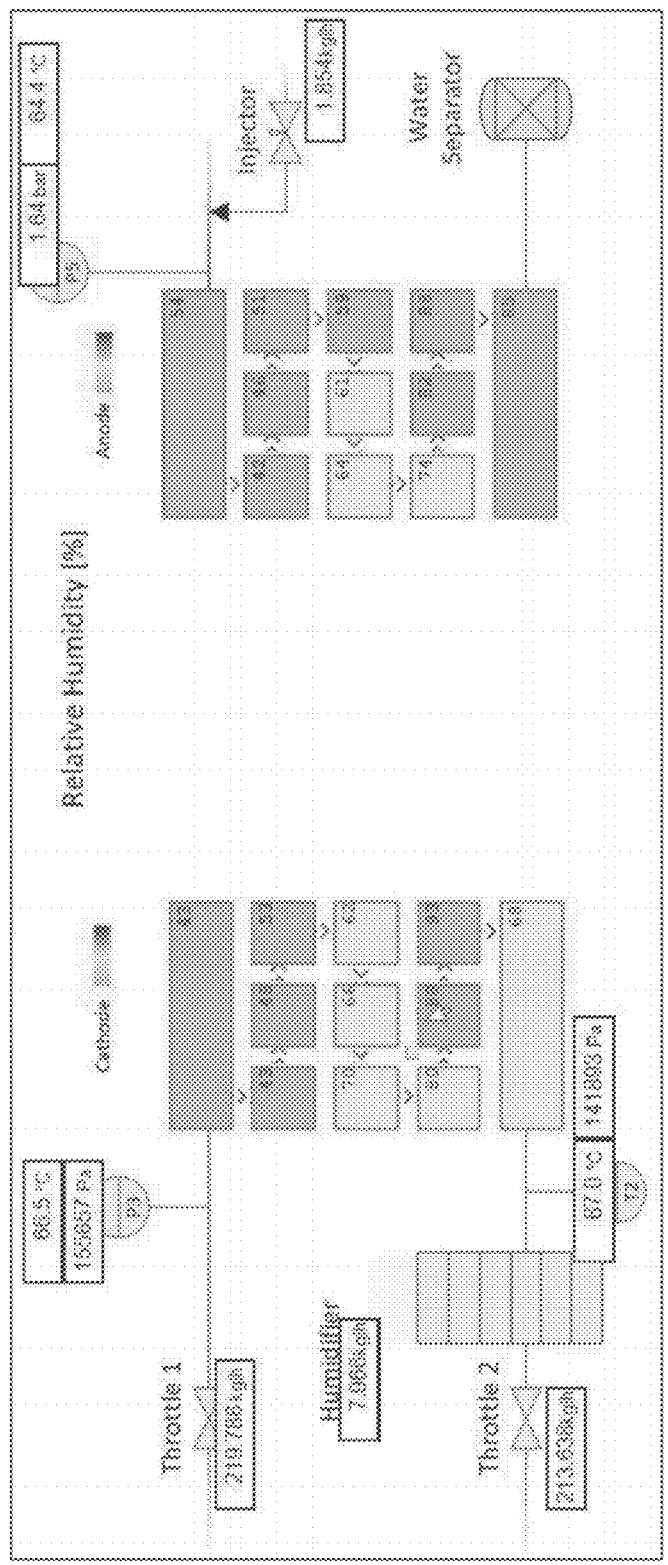
FIG. 7 illustrates a GUI for a fuel cell stack simulator and shows simulation outputs of various thermodynamic quantities, including simulated relative humidity for each individual volume element, according to an embodiment
Figure 8:
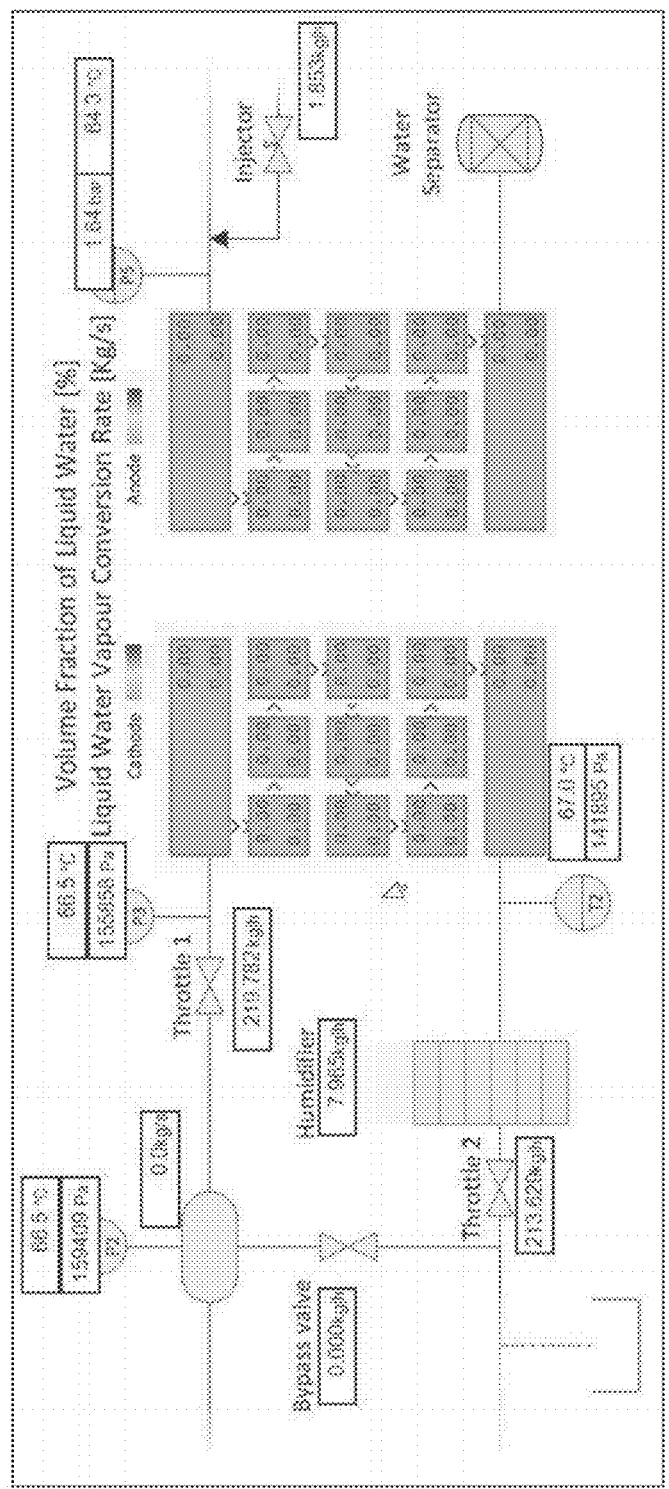
FIG. 8 illustrates a GUI for a fuel cell stack simulator and shows simulation outputs of various thermodynamic quantities, including simulated liquid water layout, according to an embodiment.

FIG. 4 to FIG. 8 depict various GUIs for control software of a simulator; these figures include a simulation setup of an entire fuel cell, including anode, cathode, and membrane, complete with volume elements, flow channel elements and various simulation outputs of several thermodynamic quantities for each individual volume element. Simulated (and displayed) parameters for the fuel cell may include, for example, fuel cell stack temperature values as shown in FIG. 4, fuel cell stack pressure values as shown in FIG. 5, fuel cell stack mass flux values as shown in FIG. 6, fuel cell stack relative humidity values as shown in FIG. 7, and fuel cell stack liquid water content values as shown in FIG. 8.

Figure 9:
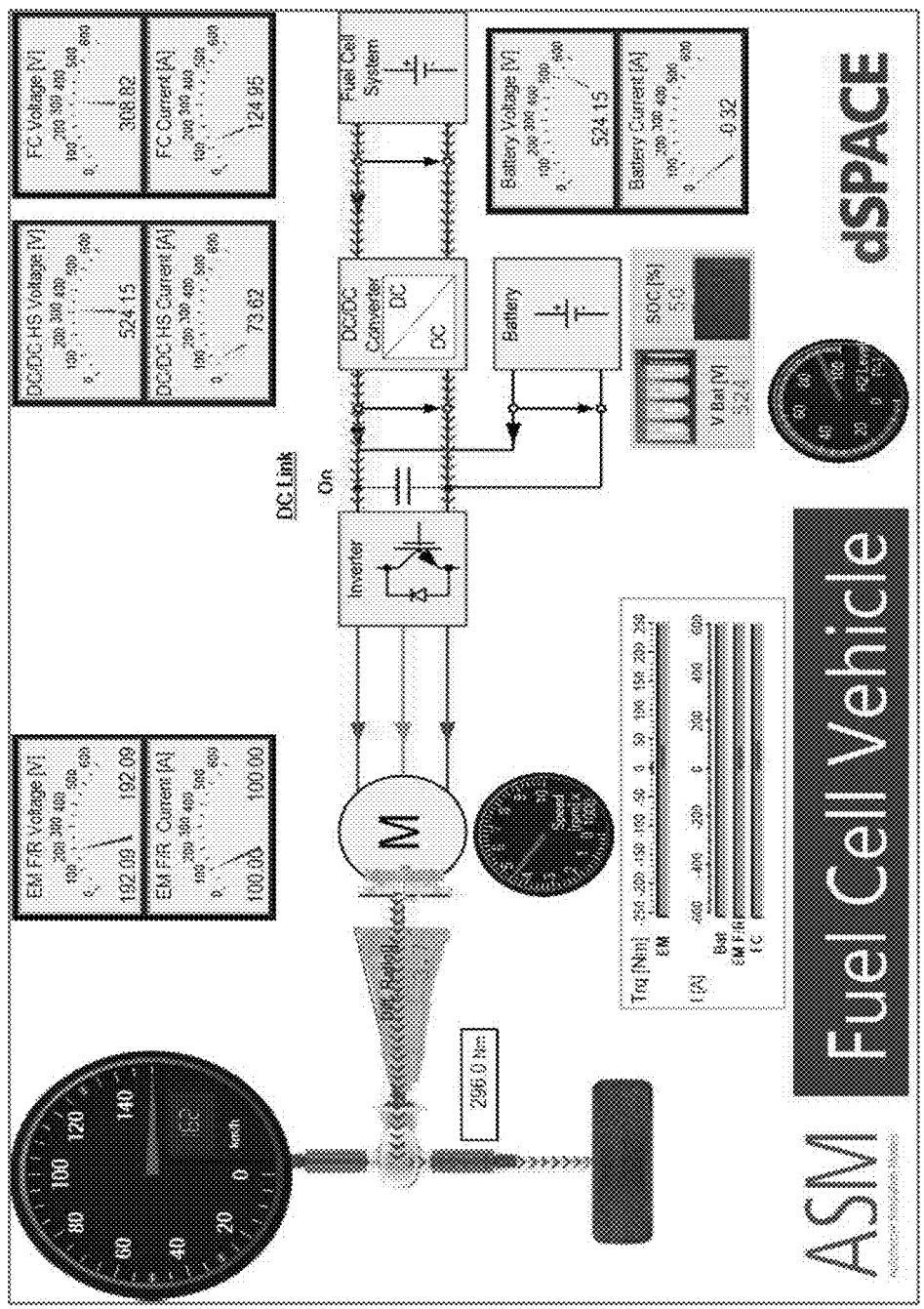
FIG. 9 illustrates an example vehicle drivetrain layout including information about simulated power flows, currents, torques and voltages in a fuel cell electric vehicle, according to an embodiment.

FIG. 9 depicts an example of how the fuel cell simulation may be applied more broadly; FIG. 9 shows a simulation of the fuel cell periphery. The instruments in the upper right corner (FC Voltage, FC Current) show the simulated voltage and current output. Both may be fed into a DC/DC converter simulation and may be applied to calculate a torque on a vehicle shaft or other operational features of the vehicle.

One advantage of the current embodiments, especially when used for fuel cells, is that there may be two (or multiple) networks of volume and flow elements: one may represent the gas channel geometry on the anode side, the another the cathode side. The arrangement of the volume elements 1 to 11 shown in the example shown in FIG. 3, for example, may lie one above another. The volume elements with the same index are respectively connected via the membrane of the fuel cell. With this approach, different gas channel geometries can be combined in a very simple manner on the anode and cathode side without changing the assignment of the volume elements of the anode and cathode side with the same index to one another.

In an embodiment, a method includes simulating one or more parameters, such as simulating an electric current through an electrical connection between a selection of container volumes on the anode side and a selection of volumes on the cathode side.

Figure 10:
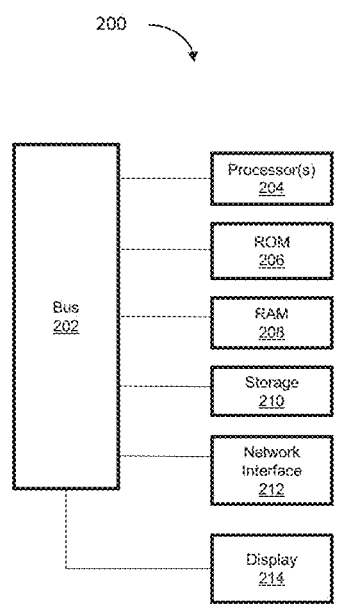
FIG. 10 is a block diagram of a processing system including one or multiple processors and associated memory, according to an embodiment

FIG. 10 is a block diagram of a processing system 200 (e.g., a computer or computer system) according to an embodiment. The processing system 200 can be used to implement the protocols, devices, mechanisms, systems and methods described above and herein. A processing system 200 may include one or multiple processors 204, such as a central processing unit (CPU) of a computing device or a distributed processor system. The processor(s) 204 may execute processor-executable instructions for performing the functions and methods described above. In embodiments, the processor executable instructions are locally stored or remotely stored and accessed from a non-transitory computer readable medium, such as storage 210, which may be a hard drive, cloud storage, flash drive, etc. Read Only Memory (ROM) 206 includes processor-executable instructions for initializing the processor(s) 204, while the random-access memory (RAM) 208 is the main memory for loading and processing instructions executed by the processor(s) 204. The network interface 212 may connect to a wired network or cellular network and to a local area network or wide area network, such as the Internet, and may be used to receive and/or transmit data, including datasets such as simulation results and thermodynamic parameters, datasets representing requested data or data streams acting as input data or output data, etc. In certain embodiments, multiple processors perform the functions of processor(s) 204. Bus 202 provides communication paths between the various components of processing system 200. Display 214 includes a display device or screen configured to display visual representations of datasets, simulations and GUI elements as described herein.

Embodiments of the present invention provide the following advantages and improvements:

Transparency of the Simulink model;

The ability to parameterize the Simulink model, i.e. the specification of mapping matrices defines the design of the simulated network of volume elements linked with flow channel elements;

Flexibility, i.e. the Simulink model remains "graphically" identical, although it represents completely different networks as specified by the mapping matrices.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for computer-based simulation of a real hydrogen fuel cell system using a computer, wherein the real hydrogen fuel cell system includes a gas container volume network having gas container volumes interconnected by gas transport lines, the method comprising:

defining a volume element class representing a gas container volume in a model fuel cell;

defining a flow channel element class representing a gas line in the model fuel cell that transports gas from one gas container volume to a different gas container volume, defining a plurality of volume instances of the volume element class corresponding to a plurality of gas container volumes in the real hydrogen fuel cell system;

defining a plurality of flow channel instances of the flow channel element class corresponding to a plurality of gas transport lines in the real hydrogen fuel cell system;

for each of the plurality of flow channel instances, creating a first interconnection representation that defines a source container volume and a destination container volume for the flow channel instance, wherein the first interconnection representation for the plurality of flow channel instances mimics a portion of the gas container volume network of the real hydrogen fuel cell system;

in the first interconnection representation, defining a gas inlet that introduces gas into a first container volume of the model fuel cell, and defining a gas outlet that outputs or releases gas from a second container volume of the model fuel cell; and simulating, using the first interconnection representation, a thermodynamic state for each of the plurality of volume instances, the thermodynamic state representing at least one user-defined thermodynamic parameter in each container volume of the portion of the gas container volume network of the real hydrogen fuel cell system.

2. The method of claim 1, wherein the steps of defining are performed in response to user input received from a computer user interface.

3. The method of claim 1, wherein the real hydrogen fuel cell comprises a proton-exchange membrane fuel cell.

4. The method of claim 1, wherein the at least one thermodynamic parameter includes a temperature, or a pressure, or a temperature and a pressure.

5. The method of claim 1, wherein the first interconnection representation for the plurality of flow channel instances mimics the entire gas container volume network of the real hydrogen fuel cell system.

6. The method of claim 1, wherein the interconnection representation mimics an anode portion or a cathode portion of the real hydrogen fuel cell, wherein the method further includes:

creating a second interconnection representation that mimics the other of the cathode portion or the anode portion of the real hydrogen fuel cell; and in parallel with simulating the first interconnection representation, simulating the second interconnection representation.

7. The method of claim 1, further including outputting a visual representation of the simulated thermodynamic state of at least one gas container volume in the gas container volume network of the real hydrogen fuel cell system.

8. A system configured to simulate gas flow dynamics of a real hydrogen fuel cell system, wherein the real hydrogen fuel cell system includes a gas container volume network having gas container volumes interconnected by gas transport lines, the system comprising:
   one or more processors; and
   a memory storing instructions, which when executed by the one or more processors, cause the one or more processors to:
   define a volume element class representing a gas container volume in a model fuel cell;
   define a flow channel element class representing a gas line in the model fuel cell that transports gas from one gas container volume to a different gas container volume,
   define a plurality of volume instances of the volume element class corresponding to a plurality of gas container volumes in the real hydrogen fuel cell system;
   define a plurality of flow channel instances of the flow channel element class corresponding to a plurality of gas transport lines in the real hydrogen fuel cell system;
   for each of the plurality of flow channel instances, create a first interconnection representation that defines a source container volume and a destination container volume for the flow channel instance, wherein the first interconnection representation for the plurality of flow channel instances mimics a portion of the gas container volume network of the real hydrogen fuel cell system;
   in the first interconnection representation, define a gas inlet that introduces gas into a first container volume of the model fuel cell, and define a gas outlet that outputs or releases gas from a second container volume of the model fuel cell; and
   simulate, using the first interconnection representation, a thermodynamic state for each of the plurality of volume instances, the thermodynamic state representing at least one user-defined thermodynamic parameter in each container volume of the portion of the gas container volume network of the real hydrogen fuel cell system.

9. The system of claim 8, further comprising a computer-user interface configured to receive user input, wherein the instructions to define classes and instances utilize the received user input.

10. The system of claim 8, wherein the real hydrogen fuel cell comprises a proton-exchange membrane fuel cell.

11. The system of claim 8, wherein the at least one thermodynamic parameter includes a temperature, or a pressure, or a temperature and a pressure.

12. The system of claim 8, wherein the first interconnection representation for the plurality of flow channel instances mimics the entire gas container volume network of the real hydrogen fuel cell system.

13. The system of claim 8, wherein the interconnection representation mimics an anode portion or a cathode portion of the real hydrogen fuel cell, wherein the instructions further include instructions to:
   create a second interconnection representation that mimics the other of the cathode portion or the anode portion of the real hydrogen fuel cell; and
   in parallel with simulating the first interconnection representation, simulate the second interconnection representation.

14. The system of claim 8, further including a display device, and wherein the instructions further include instructions to output a visual representation of the simulated thermodynamic state of at least one gas container volume in the gas container volume network of the real hydrogen fuel cell system.

15. A non-transitory computer-readable storage medium having instructions stored thereon, which when executed by one or more processors, cause the one or more processors to simulate gas flow dynamics of a real hydrogen fuel cell system, wherein the real hydrogen fuel cell system includes a gas container volume network having gas container volumes interconnected by gas transport lines, wherein execution of the instructions by the one or more processors cause the one or more processors to:
   define a volume element class representing a gas container volume in a model fuel cell;
   define a flow channel element class representing a gas line in the model fuel cell that transports gas from one gas container volume to a different gas container volume,
   define a plurality of volume instances of the volume element class corresponding to a plurality of gas container volumes in the real hydrogen fuel cell system;
   define a plurality of flow channel instances of the flow channel element class corresponding to a plurality of gas transport lines in the real hydrogen fuel cell system;
   for each of the plurality of flow channel instances, create a first interconnection representation that defines a source container volume and a destination container volume for the flow channel instance, wherein the first interconnection representation for the plurality of flow channel instances mimics a portion of the gas container volume network of the real hydrogen fuel cell system;
   in the first interconnection representation, define a gas inlet that introduces gas into a first container volume of the model fuel cell, and define a gas outlet that outputs or releases gas from a second container volume of the model fuel cell; and
   simulate, using the first interconnection representation, a thermodynamic state for each of the plurality of volume instances, the thermodynamic state representing at least one user-defined thermodynamic parameter in each container volume of the portion of the gas container volume network of the real hydrogen fuel cell system.

16. The non-transitory computer-readable storage medium of claim 15, wherein the at least one thermodynamic parameter includes a temperature, or a pressure, or a temperature and a pressure.

17. The non-transitory computer-readable storage medium of claim 15, wherein the first interconnection representation for the plurality of flow channel instances mimics the entire gas container volume network of the real hydrogen fuel cell system.

18. The non-transitory computer-readable storage medium of claim 15, wherein the interconnection representation mimics an anode portion or a cathode portion of the real hydrogen fuel cell, wherein the instructions further include instructions to:
   create a second interconnection representation that mimics the other of the cathode portion or the anode portion of the real hydrogen fuel cell; and
   in parallel with simulating the first interconnection representation, simulate the second interconnection representation.

19. The non-transitory computer-readable storage medium of claim 15, further including instructions to output or display on a display device a visual representation of the simulated thermodynamic state of at least one gas container volume in the gas container volume network of the real hydrogen fuel cell system.

20. The non-transitory computer-readable storage medium of claim 15, further comprising instructions to receive user input from a computer-user interface, wherein the instructions to define classes and instances utilize the user input.

\* \* \* \* \*